United States Patent [19]
Gupta et al.

[11] Patent Number: 5,535,116
[45] Date of Patent: Jul. 9, 1996

[54] FLAT CACHE-ONLY MULTI-PROCESSOR ARCHITECTURES

[75] Inventors: Anoop Gupta, Menlo Park; Truman Joe, Mountain View, both of Calif.

[73] Assignee: Stanford University, Stanford, Calif.

[21] Appl. No.: 63,628

[22] Filed: May 18, 1993

[51] Int. Cl.[6] ................................................. G05B 15/00
[52] U.S. Cl. ...................... 364/134; 364/131; 395/200.08
[58] Field of Search ..................................... 364/131, 133, 364/134; 395/427, 842, 200.01, 200.08

[56] References Cited

U.S. PATENT DOCUMENTS

| | | | |
|---|---|---|---|
| 4,975,833 | 12/1990 | Jinzaki | 364/134 |
| 5,055,999 | 10/1991 | Frank et al. | 364/200 |
| 5,151,989 | 9/1992 | Johnson et al. | 395/600 |
| 5,179,702 | 1/1993 | Spix et al. | 395/650 |
| 5,191,578 | 3/1993 | Lee | 370/63 |
| 5,202,987 | 4/1993 | Bayer et al. | 395/650 |
| 5,297,269 | 3/1994 | Donaldson et al. | 395/425 |
| 5,394,555 | 2/1995 | Hunter et al. | 395/800 |

OTHER PUBLICATIONS

Kai Li et al., "Memory Coherence in Shared Virtual Memory Systems," *ACM*, pp. 229–239 (Sep. 1986).
Kai Li, "Shared Virtual Memory on Loosely Coupled Multiprocessors," Ph.D. Thesis, Yale University (Sep. 1986).

*Primary Examiner*—Paul P. Gordon
*Attorney, Agent, or Firm*—Hamilton, Brook, Smith & Reynolds

[57] ABSTRACT

A flat directory organization is used to create a flat cache-only multi-processor architecture. Directory memories are uniformly distributed among all the processor nodes. Every valid memory partition has an associated physical address, which is used to determine a statically assigned home node for that partition. The home directory at the home node is the only directory that maintains state information for that partition. The home directory keeps track of which nodes have a copy of a partition and the current state of that partition. The flat directory organization does not depend on any specific interconnection. Any scalable network can be used to interconnect the processing nodes.

38 Claims, 10 Drawing Sheets

FLAT CACHE-ONLY MULTI-PROCESSOR ARCHITECTURES

GOVERNMENT SUPPORT

This invention was made with Government support under contract N00039-91-C-0138 and CCR9057558 awarded by the Advanced Research Projects Agency and National Science Foundation respectively. The Government has certain rights in this invention.

BACKGROUND OF THE INVENTION

Large-scale multi-processors with a single address-base and coherent caches offer a flexible and powerful computing environment. The single address-base and coherent caches together ease the problem of data partitioning and dynamic load balancing. The single address-base and coherent caches also provide better support for parallelizing compilers, standard operating systems, and multiprogramming, thus enabling more flexible and effective use of the machine. Currently, many research groups are pursuing the design and construction of such multi-processors. As research has progressed in this area, two variants have emerged, namely Cache-Coherent Non-Uniform Memory Access (CC-NUMA) machines and Cache-Only Memory Architecture (COMA) machines.

Both CC-NUMA and COMA machines have a distributed main memory, a scalable interconnection network, and directory-based cache coherence. Distributed main memory and scalable interconnection networks are essential in providing the required scalable memory bandwidth. Directory-based schemes provide cache coherence, consuming only a small fraction of the system bandwidth without requiring message broadcasts. In contrast to CC-NUMA machines, COMA machines convert the per-node main memory into a large secondary or tertiary cache, which is also called Attraction Memory (AM). The conversion occurs by adding tags to cache-line size partitions of data in main memory. A consequence is that the location of a data item in the machine is decoupled from the physical address of the data items, and the data item is automatically migrated or replicated in main memory depending on the memory reference pattern.

An advantage of COMA machines is that they can reduce the average cache miss latency, because data is dynamically migrated and replicated at the main-memory level. However, there are also several disadvantages. First, allowing migration data at the memory level requires a mechanism to locate the data on a miss. To avoid broadcasting such requests, current machines use a hierarchical directory structure, which increases the miss latency for global request. Second, the coherent protocol is more complex because it needs to ensure that the last copy of a data item is not replaced in the attraction memory (i.e., main memory). Also, as compared to CC-NUMA machines, there is additional complexity in the design of the main-memory subsystem and in the interface to the disk subsystem.

SUMMARY OF THE INVENTION

The problem of data placement in shared-memory multi-processors is difficult to solve given the dynamic nature of application reference patterns. Traditional NUMA shared memory machines, such as the Stanford University DASH and the MIT Alewife, are sensitive to the data placement problem because the access latencies to remote memories are often much longer than the access latencies to local memories. COMA machines such as the Kendell Square Research KSR1 machine and the Swedish Institute of Computer Science DDM machine address the data placement problem by replacing main memory with a level of large caches (i.e., attraction memories). These distributed memories permit data items to migrate and replicate themselves in response to changing application reference patterns. Because the attraction memories are organized like a cache, cache conflicts will cause replacements. If the data item selected for replacement is the last copy of a datum, that data item cannot be discarded. The datum must be sent to another attraction memory in a replacement message. When an applications data set size is large compared to the total attraction memory size, a high rate of replacements will occur hindering performance. Because of this effect in COMA machines, the effective useful memory size is smaller than the total memory size.

In shared-memory multi-processors that use a write-invalidate cache coherence protocol, cache misses may be classified into four types. A cold miss is the result of a block being accessed by a processor for the first time. A capacity miss is a miss due to the finite size of the processor cache. A conflict miss is due to the limited associativity of the cache. A coherence miss (or an invalidation miss) is a miss to a block that has been referenced before, but has been written by another processor since the last time the block was referenced by this processor. Because CC-NUMA and COMA machines respond to conflict misses and capacity misses in the same way, they are collectively referred to as capacity misses. Coherence misses include both fault sharing misses as well as true sharing misses. Fault sharing misses result from write references to data that are not shared but happen to reside in the same cache line. True sharing misses are coherence misses that would still exist even if the block size were one access unit. They represent true communication between the multiple processes in the application.

For applications with low miss rates, CC-NUMA and COMA machines achieve nearly identical performance. Performance differences arise as a result of the efficiency with which CC-NUMA and COMA machines handle cache misses. COMA machines handle capacity misses more efficiently than CC-NUMA machines. The replication and migration of small partitions of data at the main-memory level allows COMA to serve a majority of such misses locally. CC-NUMA machines handle coherent misses more efficiently than do COMA machines. The hierarchical directory structure required by COMA machines results in a much larger latency than the flat structure in CC-NUMA.

In contrast to COMA machines, CC-NUMA machines can replicate and migrate data at the main-memory level only in large page-sized partitions. However, proper initial placement and smart migration of pages can be effective for scientific applications that use coarse-grained data partitions. Overall, using page migration, CC-NUMA performs better than COMA or is at least competitive with COMA.

The present invention solves the disadvantages of the prior art by defining a tightly-coupled shared-memory computer system having a cache-based architecture that does not rely on a hierarchical directory structure. Like COMA machines, a preferred embodiment uses an attraction memory cache. Such an architecture offers significant performance improvements over both CC-NUMA and COMA machines. A preferred embodiment of the invention employs a flat directory-based cache coherence protocol.

The cache coherence protocol of a preferred embodiment of the invention utilizes a flat directory organization. Directory memories are uniformly distributed among all the processor nodes. Every valid memory partition has an associated physical address that is used to determine a statically assigned home node for that partition. The directory at the home node is the only directory that maintains state information for that memory partition. The home directory keeps track of which nodes have a copy of the assigned memory partition and the current state of those memory partitions. Because of the flat directory organization, a preferred embodiment of the invention does not depend on any specific interconnection. Any scalable network, such as a mesh, hypercube, or multi-stage network, can be used to interconnect the processing nodes.

In a preferred embodiment of the invention, a shared-memory computer system is formed from a plurality of tightly-coupled processing nodes. Each processing node has a data processor for executing software instructions, a main memory cache, a processor cache disposed between the data processor and the main memory cache, and a directory memory. The main memory cache caches to a global shared memory space organized in pages, each page having a plurality of respectively addressed data items. The directory memory centralizes directory information for each data item assigned to the processing node. The computer also has a general interconnection network for coupling the processing nodes.

In particular, the directory memory has a state memory for maintaining the current state of each data item assigned to the respective processing node. In addition, the directory memory has a pointer to a master node for each data item, the master node being the exactly one processing node having a master copy of the data item. The directory memory also has a list of sharer nodes, each sharer node having a copy of the data item.

The computer system has a plurality of home processing nodes. The home processing nodes are assigned from the plurality of processing nodes, the address of each data item is used to assign the home processing node for that data item. Each home processing node has a home directory memory for centralizing directory information for each data item assigned to the home processing node.

The home processing nodes are essentially uniformly distributed among the processing nodes. The home processing nodes are assigned by a hashing function. The hashing function is preferably based on the high-order bits of the address in the memory space of each data item.

The directory information contains an indication of the current state of the data item, a pointer to the current master node for the data item, and a list of sharer nodes for the data item. The master node being the exactly one processing node having a master copy of the data item and the sharer nodes having a copy of the data item.

The main memory portion is an attraction memory cache. The attraction memory cache is preferably divided into a plurality of banks. In addition, the attraction memory is preferably a set-associative attraction memory. The attraction memory cache is not backed-up by physical memory.

In a preferred embodiment of the invention, a data item from a memory page of data items is accessed by a local processing node. The data item is stored external to the local processing node on a shared-memory computer system. A first access request is transmitted from the local processing node to a home processing node. The home processing node is statically assigned to the data item. In the home processing node, a master processing node is determined by a home directory. The master processing node has a current copy of the data item. A second access request is transmitted from the home processing node to the master processing node. Preferably, the second access request is a duplicate of the first access request. A copy of the data item is transmitted from the master processing node to the local processing node.

If the access request is a read access request, the local processing node is added to a list of sharer processing nodes. The sharer processing nodes having read access to the data item. The list of sharer processing nodes is maintained in the home processing node.

If the access request is a write access request, shared copies of the data item are invalidated and the local processing node is designated as the master processing node. The shared copies of the data item are on at least one processing node other than the local processing node. The processing node other than the local processing node may include the master processing node.

In addition, an acknowledgement message may be transmitted from the local processing node to the home processing node to acknowledge receipt of the copy of the data item.

BRIEF DESCRIPTION OF THE DRAWINGS

The above and other features of the invention, including various novel details of construction and combination of parts, will now be more particular described with reference to the accompanying drawings and pointed out in the claims. It will be understood that the particular computing system embodying the invention is shown by way of illustration only and not as a limitation of the invention. The principles and features of this invention may be employed in varied and numerous embodiments without departing from the scope of the invention.

DETAILED DESCRIPTION OF PREFERRED EMBODIMENT OF THE INVENTION

Figure 1A:
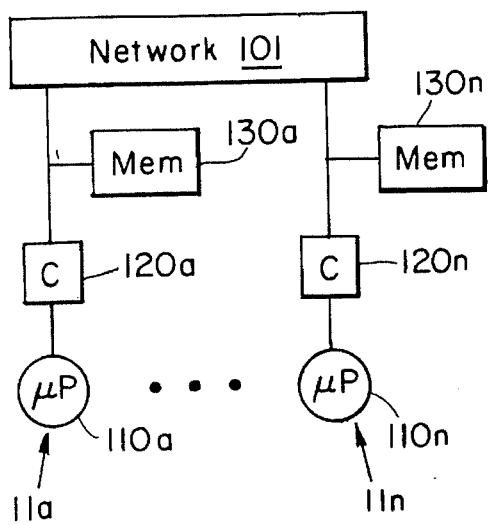
FIG. 1A is a block diagram of the high level organization of a prior art NUMA machine.

FIG. 1A is a block diagram of the high level organization of a prior art NUMA machine. A CC-NUMA machine consists of a number of processing nodes $11a, \ldots, 11n$ connected through a high-bandwidth low-latency interconnect network 101. Each processing node 11 consists of a high-performance processor 110, an associated cache 120 and a portion 130 of global shared memory. Cache coherence is maintained by a directory-based, write-invalidate cache coherence protocol. To keep all caches $120a, \ldots, 120n$ consistent, each processing node $11a, \ldots, 11n$ has a directory memory corresponding to its portion 130 of the shared physical memory. For each memory line (aligned memory block that has the same size as a cache line), the directory memory records the identities of remote nodes caching that memory line. Thus, using the directory, it is possible for a node 11 writing a location to send point-to-point messages to invalidate remote copies of the corresponding cache line.

The CC-NUMA software model allows processes to be attached to specific processors and for data to be allocated from the main memory of any specific node. However, the granularity at which data can be moved transparently between different main memories of different nodes in page-sized partitions. A page is typically between 512 and 4K bytes in size. The allocation and movement of data between nodes may be done explicitly via software written by the application programmer, or automatically by the operating system.

Figure 1B:
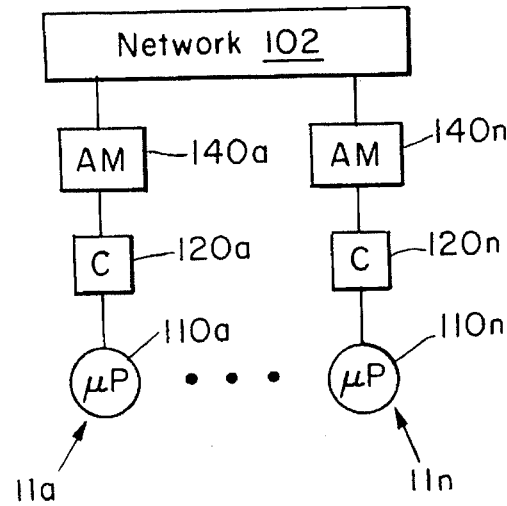
FIG. 1B is a block diagram of the high level organization of a prior art COMA machine.

In contrast, COMA machines perform migration and replication automatically at the granularity of cache blocks. A cache block is typically 16 or 32 bytes in size. FIG. 1B is a block diagram of the high level organization of a COMA machine. A COMA machine, like CC-NUMA, consists of a number of processing nodes $11a, \ldots, 11n$ connected by an interconnection network 102. Each processing node 11 has a high-performance processor 110, a cache 120 and a portion 140 of the global shared memory. The difference is that the memory 140 associated with each node 11 is augmented to act as a large cache, which is denoted as an Attraction Memory (AM). Consistency among cache blocks in the attraction memory 140 is maintained using a write-invalidate protocol. The attraction memories $140a, \ldots, 140n$ allow transparent migration and replication of data items to nodes 11 where they are referenced.

In a COMA machine, the attraction memories $140a, \ldots, 140n$ constitute the only memory in the system, other than the disk subsystem. A consequence is that the location of a memory partition is totally decoupled from the physical address of the memory partition. This decoupling creates several problems. First, when a reference misses in the local attraction memory 140, a mechanism is needed to trace a copy of that memory partition in the attraction memory 140 of some arbitrary node 1. Second, some mechanism is needed to ensure that the last copy of a memory partition, which is possibly the only valid copy, is not purged from memory.

To address the above problems and to maintain cache and memory consistency, COMA machines use a hierarchical directory scheme and a corresponding interconnection network 102 that is at least logically hierarchical. Each directory maintains state information about all memory partitions stored in the subsystem below. The state of a memory partition is either exclusive in exactly one node or shared in several nodes. Directories only contain state information to reduce memory overhead; data items are not stored in the directories.

COMA machines have the potential of reducing the number of cache misses that need to be serviced remotely because individual memory partitions are migrated and replicated in attraction memories $140a, \ldots, 140n$. However, because of the hierarchy in COMA machines, latency for remote misses is usually higher than in CC-NUMA machines. The higher latency may offset the advantages of the higher hit rates.

A preferred embodiment of the invention supports migration and replication of cache blocks at the main-memory level by organizing main memory as an attraction memory (i.e., there are tags associated with each cache block). In addition, each cache block has a clear notion of a home node, and the directory memory in the home node keeps track of all copies of that cache block. The home node does not reserve main memory for cache blocks for which the home node keeps directory entries. Thus, cache blocks whose home node is some other processing node can go to and reside in any processing node.

Figure 2:
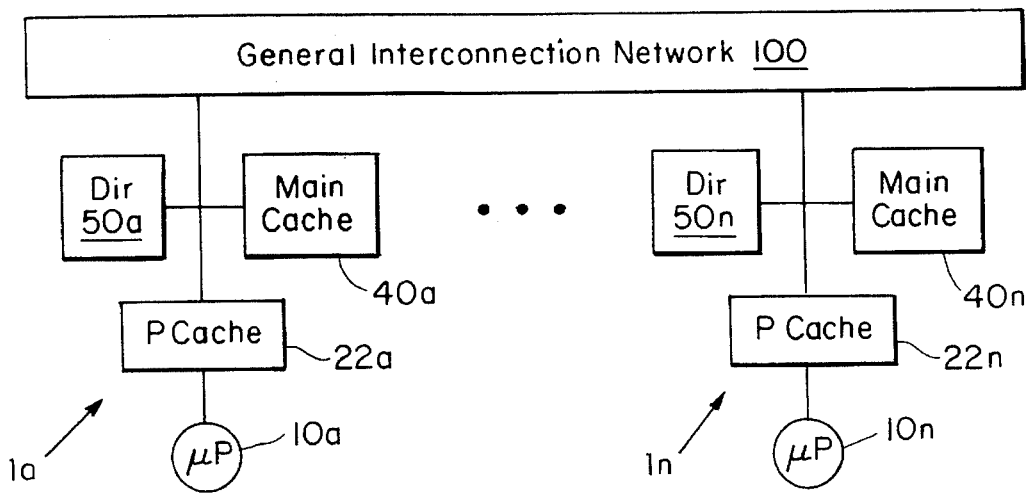
FIG. 2 is a block diagram of the system organization of a preferred embodiment of the invention.

FIG. 2 is a block diagram of the system organization of a preferred embodiment of the invention. A plurality of processing nodes $1a, \ldots, 1n$ are coupled to a general interconnection network 100. Each processing node $1a, \ldots, 1n$ includes a processor $10a, \ldots, 10n$; a processor cache $22a, \ldots, 22n$; a main cache $40a, \ldots, 40n$; and a directory memory $50a, \ldots, 50n$. The main cache 40 is organized as an attraction memory.

In a preferred embodiment, each processing node 1 has a portion 40 of the global shared memory and a portion 50 of the global directory memory. The directory memory 50 is organized into directory entries corresponding to memory lines present in the system. The directory memory 50 holding the directory entry for a memory line is determined by looking at the physical address of the memory line.

Figure 3A:
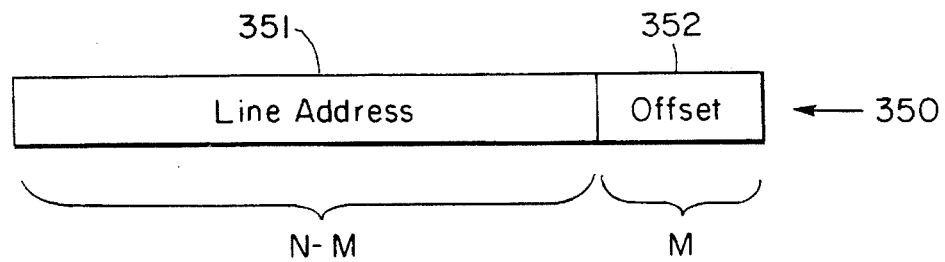
FIG. 3A illustrates the physical address description in a preferred embodiment of the invention.

FIG. 3A illustrates the physical address decomposition in a preferred embodiment of the invention. A physical address 350 for the memory lines is logically divided into two parts, a line address 351 and a line offset 352. The physical address 350 is N bits wide, where $N = \log_2$ (physical address space).

The offset 352 is M bits wide, where $M = \log_2$ (line size).

The remaining (N–M) bits are allocated to the line address 351.

The desired directory memory 50 is determined by using a hash function to distribute the entries for all possible line addresses 350 among the directory memories $50a, \ldots, 50n$ in the machine. Although a hashing function can be chosen arbitrarily, the upper $\log_2$ (number of processing nodes) bits are preferably used unaltered to determine the directory memory for a given memory line. All processing nodes $1a, \ldots, 1n$ are required to use the same hashing function because the directory entry for a specific memory line is stored in exactly one home directory memory.

Figure 3B:
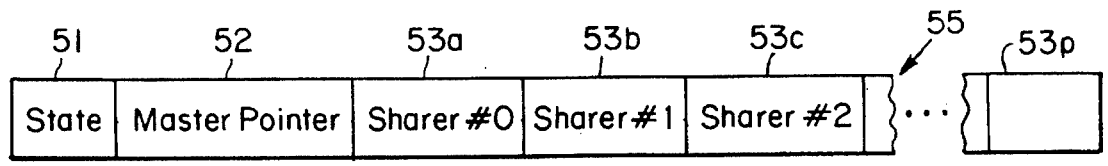
FIG. 3B illustrates the directory entry structure in the directory 50 of FIG. 2.

The directory memory consists of directory entries. FIG. 3B illustrates the directory entry structure. Each directory entry 55 records the state 51, the current master node 52 and a list of sharer nodes $53a, \ldots, 53p$, for each memory line 350. Any scalable directory structure can be used, such as a limited pointer scheme or a coarse vector scheme. However, these schemes must be modified to include a master pointer entry 52 for each directory entry 55. In some schemes, such as limited pointer schemes, a first pointer can be used to denote the master pointer 52 in all cases requiring no changes to the entry. However, coarse vector schemes cannot be adapted without reserving a number of bits for the master pointer because no distinction can be made between sharer nodes in a coarse vector to indicate a master node because there is no cardinality associated with sharer nodes in a coarse vector. While specific implementations may vary, FIG. 3B indicates the minimum preferred state information necessary to support a preferred embodiment of the invention. The possible states 51 of the directory entry 55 are "shared" (possibly multiple copies in the system), "exclusive" (exactly one copy), and "invalid" (this line is not present anywhere in the system).

The main memory 40 is organized into memory lines aligned to natural address boundaries, and each memory line has associated state and tag information, due to the cache organization of the attraction memory. Because of this organization, a valid data item may be displaced when space needs to be allocated to service an attraction memory miss. If this data item represents the last valid copy of the object in the system, then this object must be sent to another attraction memory for storage in the form of a replacement message. To minimize the number of replacement messages, the attraction memory should be organized as an associative memory between four-way associative and eight-way associative, inclusive. This increases the number of locations from which space can be allocated when servicing a memory request. A lower associativity can be used resulting in correspondingly higher rates of replacement traffic generation. To provide good memory system bandwidth, the attraction memory should also be composed of at least two independent banks of memory. The banking will double the peak memory bandwidth available.

Figure 3C:
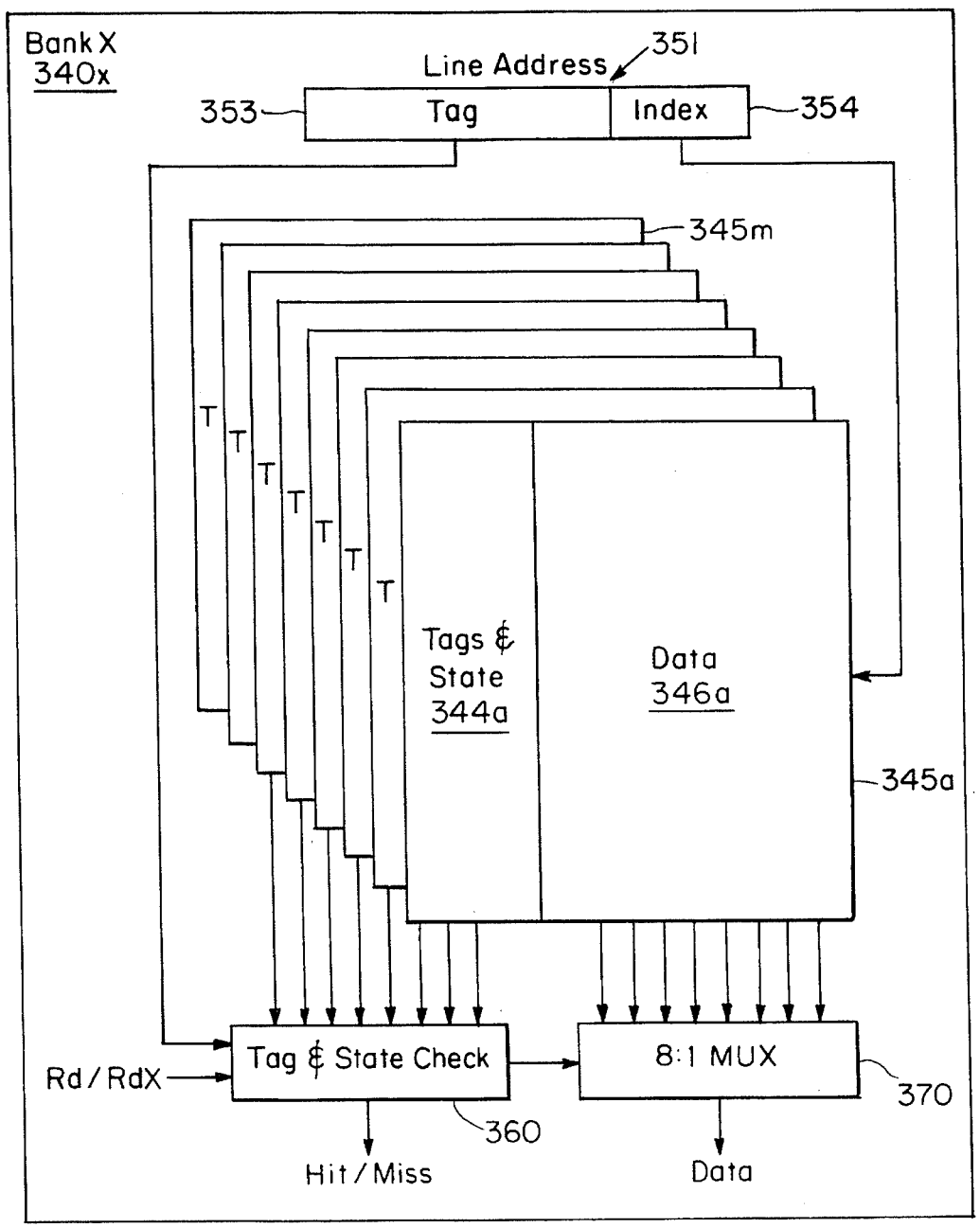
FIG. 3C is a block diagram of the organization of the main cache 40 of FIG. 2 with regard to read data paths.

FIG. 3C is a block diagram of the organization of an eight-way interleaved two-band attraction memory main cache 40 of FIG. 2. The memory references are partitioned between banks 340 based upon whether the line address is odd or even. After selecting a bank 340x, the least significant bit of the line address 351 is dropped and the remaining bits are used to index into the attraction memory sets $345a, \ldots, 345m$.

A tag and state comparison 360 is performed for each set 345 in the same manner as a traditional cache to determine if the data access is valid. Only the paths used to read data 346 out of an attraction memory 40 through an 8:1 multiplexer 370 are illustrated. To write data to the attraction memory 40, the data traverses the same data paths in the reverse direction.

The state information stored in the state and tag field 344 along with the tags 344 indicates whether the line is readable, readable and modifiable, or invalid.

Protocol Mechanisms

For the following description of the mechanisms needed to service a request in a preferred embodiment of the invention, it is assumed that a virtual address always maps to a physical address, which is resident somewhere in memory. If this is not the case, the processor will experience an exception indicating a page fault, and a full page of data will be loaded from disk into memory. Each data item in the page is assigned to a respective home directory 50. The faulting reference is then restarted with the desired memory location resident in physical memory.

The interaction between the attraction memories 40 and the processor caches 22 will be ignored in the following discussion because that mechanism is the same mechanism used to ensure multi-level cache consistency. Instead, the following discussion will concentrate on a mechanism used in the attraction memory 40 and directory memory 50. When a processor 10a issues a reference to the attraction memory 40a local to the processor 10a, a look-up is performed to determine if the desired data is present. If the desired data is present, the data is returned to the processor 10a. If the desired data is not present, the line address is extracted from the physical address and the line address is hashed to determine to which directory memory the request is sent. At the directory memory, the line address is again used to find the corresponding directory entry. If the memory operation is read-exclusive, all attraction memories on the sharing list are invalidated and the request is forwarded to the attraction memory indicated by the master pointer, and the master pointer is reset to point to the requesting attraction memory. If the operation is a read, the requestor attraction memory is added to the list of sharing nodes and again the request is forwarded to the attraction memory indicated by the master pointer. At the master attraction memory, the attraction memory performs a look up, finds the data and sends a copy of the data to the requestor attraction memory. If the request is read exclusive, the master attraction memory also invalidates a local copy and the requestor attraction memory marks its new copy as the master.

It should be noted that no operating system support is required to perform any of the coherence functions required in a preferred embodiment of the invention. All replication and migration of data occurs transparently to the operating system. Once the operating system loads a page of data from disk, the underlining hardware or firmware is responsible for managing the data in the page. The attraction memory tag and state fields $344a, \ldots, 344m$ along with the directory entries 55, maintain all state information necessary to perform this functionality.

The coherence protocol in a preferred embodiment has two functions. The primary function of the coherence protocol is to keep all copies of a memory partition coherent. By using the directory structure described above, the coherence protocol can use basically the same mechanism found in directory-based CC-NUMA machines to maintain coherence. Whenever a memory partition is modified, all copies of the memory partition as indicated by the corresponding directory entry are invalidated. Whenever a memory partition is read, the directory state is modified to indicate that the requesting node has a shared clean copy.

The second function of a preferred protocol is to ensure that every valid copy of a data item is not purged from the system. Exactly one copy of every data item in a preferred embodiment is marked "master" for that purpose. In NUMA machines, copies of a data item in a shared-clean state can be invalidated from a cache without being flushed back to memory because the memory already contains a valid copy of the data. In a preferred embodiment, there is no physical memory backing up the attraction memories. A master copy indicates that that data item cannot be purged from the system because that data item may be the last copy of the data.

Master copies that are replaced in the attraction memory cause a replacement message to be generated that is sent to the home directory. At the home directory, a random attraction memory is chosen to receive the replacement message. The directory state is modified to reflect the destination attraction memory as the new owner of the master copy, and the replacement is forwarded to that attraction memory. If that attraction memory can accept the data, the replacement data is stored in that attraction memory. Otherwise, the attraction memory sends a replacement message with the data back to the home directory, which selects another attraction memory. This process repeats until some attraction memory can accept the data.

The directory always selects the next attraction memory from the group of attraction memories that have not yet been visited by the current replacement chain. Any criterion can be used to ensure that the next attraction memory has not yet been visited by the current replacement chain. One such criterion is to number the attraction memories and always send the replacement message to an attraction memory having a higher cardinality.

Each directory entry contains a pointer to one of the copies denoted "master", and a list of other nodes having a copy of the data item, called the shared list. The state of a directory entry can either be shared or exclusive. The state of an attraction memory partition can be one of invalid, shared, master-shared, or exclusive. If a data item is in master-shared or exclusive state in some node, it implies that the directory entry considers that node to be the master. As for directory-memory overhead, it is possible to use limited-pointer directory schemes.

The protocol will now be defined through a set of transaction flow diagrams shown in FIGS. 4–9, which represent preferred protocol transactions required to handle the common cases of each coherence operation. Certain exception conditions can occur during a protocol transaction, such as a node giving up the data prior to the request arriving at the node. However, these cases should occur infrequently and are therefore omitted to simplify the illustrations and the discussion.

The coherence protocol that follows is just one protocol that may be used to provide cache coherence in a preferred embodiment of the invention. This particular protocol maintains the following basic goals:

1) Simplicity: the protocol should be simple to implement and easy to understand, reducing the engineering time required and facilitating system debugging; and 2) Efficiency: the protocol should supply data for read operations in the minimum number of network traversals, the protocol should also minimize the total number of messages sent for a request.

To describe the coherence protocol, the processing nodes $1a, \ldots, 1n$ are divided into three overlapping categories. A local node is a processing node containing the CPU that issues a memory operation. A home node is the processing node containing the directory memory for the memory operation. A remote node is any processing node that is not the local node. A node is either a local node or a remote node, and the home node for an arbitrary memory operation can be either local or remote.

Processor caches exploit temporal and spatial locality to reduce the memory access times in the preferred embodiment. These caches always contain data as a subset of the local main cache. The possible states of cache lines in the processor cache are:

1) Invalid: this data item is not valid;

2) Shared: this data item is readable; and

3) Exclusive: this data item is readable and writable.

The cache lines in the main cache can have one of the following states:

1) Invalid: this data item is not valid;

2) Shared: this data item is shared by two or more processing nodes;

3) Master Shared: this processing node may be the only processing node with a copy of this data item; and 4) Exclusive: this data item is present only in this processing node.

For performance reasons, it is desirable not to interrupt the processor cache 22 needlessly to perform coherence operations. As a result, the main cache 40 keeps additional state information on the current state of data items in the main cache that are also present in the processor cache 22.

To maintain coherence for copies of data items at the processing node level, a preferred protocol relies on directory memories that record the state of the data item at the global level. The states recorded by the directory are:

1) Invalid: this data item does not exist anywhere in the system;

2) Shared: one or more processing nodes in the system have a readable-copy of this data item; and 3) Exclusive: exactly one processing node in the system has a readable and a writable copy of this data item.

The invalid state can be used for several purposes. The invalid sate can be used to indicate an error condition in the system or to optimize the allocation memory, by creating data items in memory only when the data items are accessed. For performance reasons, it may be desirable not to allocate all data items in a page of memory until the data items are touched by the associated process, which preserves more memory for use in replication. In a preferred embodiment of the invention, the invalid state is an indication of a system error.

To simplify a later discussion on the internode coherence protocol, the details of the intranode coherence between the processor cache and the main cache are described next.

Figure 4A:
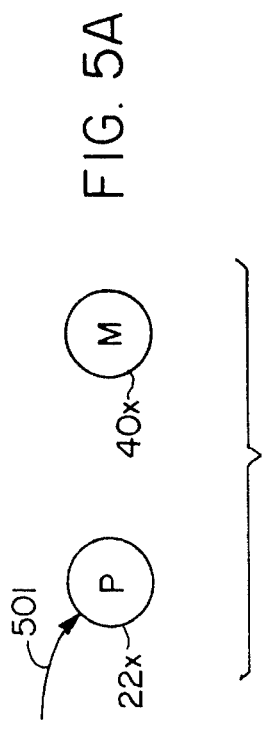
FIGS. 4A, 4B and 4C are transaction flow diagrams for processor read requests according to a preferred embodiment of the invention.
Figure 4B:
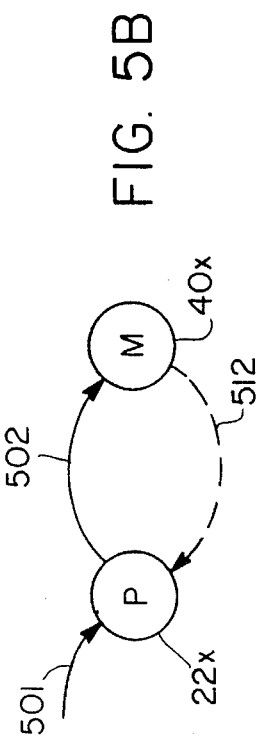
Figure 4C:
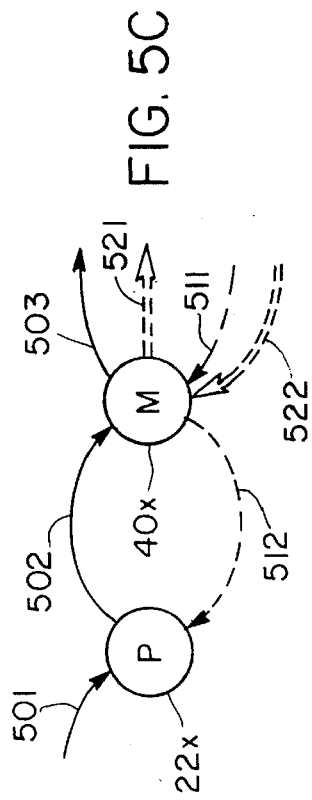

FIGS. 4A–C are transaction flow diagrams for a local processor read request.

FIG. 4A is a transaction flow diagram illustrating a read request to a shared partition in a processor cache 22x in processing node 1x. The processor 10x sends a read request 401 to the processor cache 22x. The processor cache 22x returns read data 413 to the processor 10x.

FIG. 4B is a transaction flow diagram illustrating a read request to a valid partition in the main cache 40x of a processing node 1x. The processor 10x sends a read request 401 to the processor cache 22x. The processor cache 22x sends the read request 402 ti the main cache 40x. The main cache 40x sends the read data 412 to the processor cache 22x. The processor cache 22x goes to the shared state and the processor cache 22x sends the read data 413 to the processor 10x.

FIG. 4C is a transaction flow diagram illustrating a request to a partition that is invalid in the main cache 40x of a processing node 1x. The processor 10x sends a read request 401 to the processor cache 22x. The processor cache 22x sends a read request 402 to the main cache 40x. The main cache 40x sends a read request 403 to the system. The system returns read data 411 to the main cache 40x. The main cache 40x goes to the shared state. The main cache 40 sends the read data 412 to the processor cache 22x and sends a data received acknowledgement message 421 to the system. The processor cache 22x goes to the shared state and the processor cache 22x sends the read data 413 to the processor 10x.

Figure 5A:
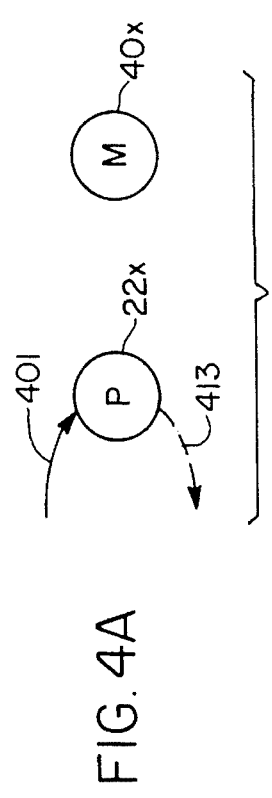
FIGS. 5A, 5B and 5C are transaction flow diagrams for processor write requests according to a preferred embodiment of the invention.
Figure 5B:
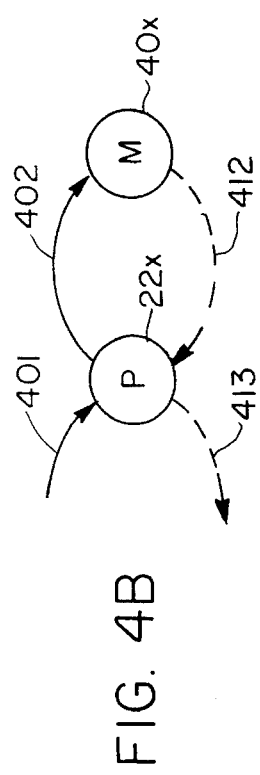
Figure 5C:
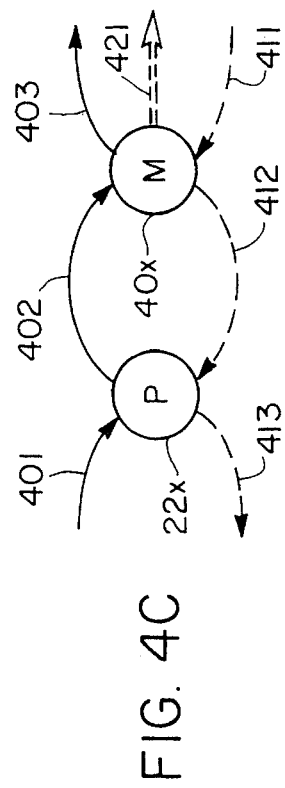

FIGS. 5A–C are transaction flow diagrams for a local processor write request.

FIG. 5A is a transaction flow diagram illustrating a write request to an exclusive partition in a processor cache 22x of a processing node 1x. The processor 10x sends a write request 501 to the processor cache 22x. The processor cache 22x performs the write operation.

FIG. 5B is a transaction flow diagram illustrating a write request to an exclusive partition in the main cache 40x of a processing node 1x. The processor 10x sends a write request 501 to the processor cache 22x. The processor cache 22x sends a read-exclusive request 502 to the main cache 40x. The main cache 40x sends the read-exclusive data 512 to the processor cache 22x. The processor cache 22x goes to the exclusive state and the processor cache 22x performs the write operation.

FIG. 5C is a transaction flow diagram illustrating a write request to a non-master partition in the main cache 40x of a processing node 1x. The processor 10x sends a write request 501 to the processor cache 40x. The processor cache 40x sends a read-exclusive request 502 to the main cache 40x. The main cache 40x sends a read-exclusive request 503 to the system. The system returns the read-exclusive data 511 to the main cache 40x. The main cache 40x goes to the exclusive state. The main cache 40x sends the read-exclusive data 512 to the processor cache 22x and sends a data received acknowledgement message 521 to the system. The system sends an invalidations complete acknowledgement message 522 to the main cache 40x. The processor cache 22x goes to the exclusive state and the processor cache 22x performs the write operation.

The only two unusual transaction messages noted above are: (1) data receipt acknowledgements 421, 521 sent to the system, and (2) invalidations complete acknowledgements 522 from the system. The data receipt acknowledgements message 421, 521 is needed because a preferred protocol does not allow overlapping memory operations to the same partition by different processors 10. The protocol must know when the current transaction has completed, as signaled by this message 421, 521, before allowing the next transaction for that partition to begin. The restriction is useful for simplifying the number of different protocol cases that the directory 50 and main caches 40 must handle. The invalidations complete message 522 is needed for the purposes of supporting memory consistency models that require the notion of when writes to memory partitions have completed.

If the local node has a partition in the master-shared or exclusive state and an external processor wishes to access this data, an external read or read-exclusive request is sent to the local node, which responds with the appropriate data.

Figure 6A:
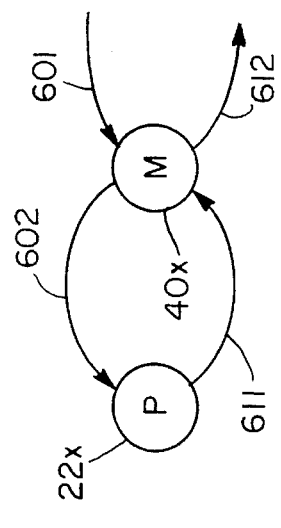
FIGS. 6A and 6B are transaction flow diagrams for external read requests according to a preferred embodiment of the invention.
Figure 6B:
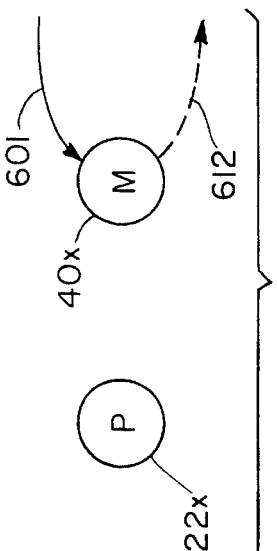

FIGS. 6A–B are block flow diagrams for an external read request.

FIG. 6A is a transaction flow diagram illustrating an external read request to an exclusive partition in the processor cache 22x of a processing node 1x. The system sends a read request 601 to the main cache 40x. The main cache 40x sends a read request 602 to the processor cache 22x. The processor cache 22x sends read data 611 to the main cache 40x. The processor cache 22x goes to the shared state. The main cache 40x sends read data 612 to the system 100. The main cache 40x goes to the master-shared state.

FIG. 6B is a transaction flow diagram illustrating an external read request to a master partition in the main cache 40x of a processing node 1x. The system sends a read request 601 to the main cache 40x. The main cache 40x sends read data 612 to the system. The main cache 40x goes to the master-shared state.

Figure 7A:
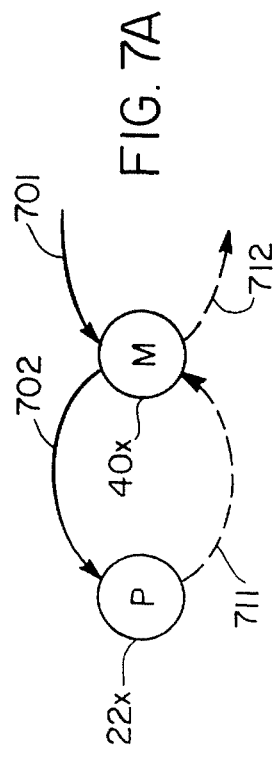
FIGS. 7A, 7B and 7C are transaction flow diagrams for external write requests according to a preferred embodiment of the invention.
Figure 7B:
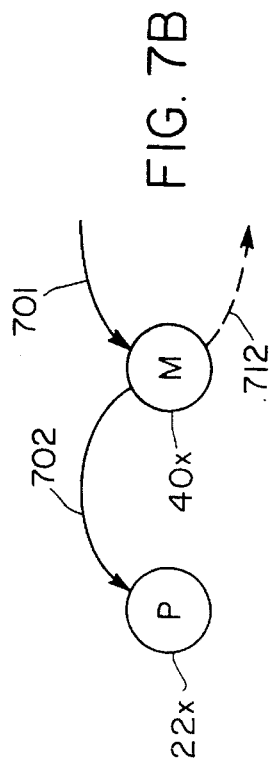
Figure 7C:
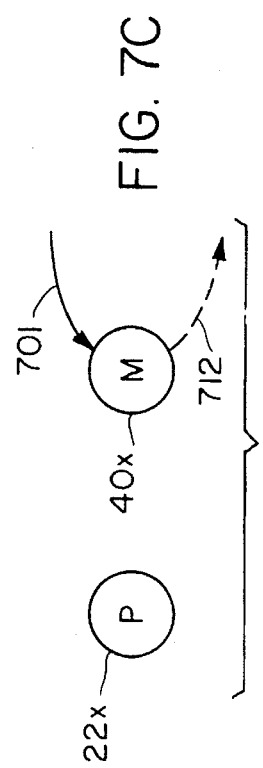

FIGS. 7A–C are transaction flow diagrams for an external read-exclusive request.

FIG. 7A is a transaction flow diagram illustrating an external read-exclusive request to an exclusive partition in the processor cache 22x of a processing node 1x. The system sends a read-exclusive request 701 to the main cache 40x. The main cache 40x sends a read-exclusive request 702 to the processor cache 22x. The processor cache 22x sends read-exclusive data 711 to the main cache 40x. The processor cache 22x goes to the invalid state. The main cache 40x sends read-exclusive data 712 to the system. The main cache 40x goes to the invalid state.

FIG. 7B is a transaction flow diagram of an external read-exclusive request to a master-shared or exclusive partition in the main cache 40x and shared in the processor cache 22x of a processing node 1x. The system sends a read-exclusive request 701 to the main cache 40x. The main cache 40x sends an invalidate request 702 to the processor cache 22x. The processor cache 22x goes to the invalid state. The main cache 40x sends read-exclusive data 712 to the system. The main cache 40x goes to the invalid state.

FIG. 7C is a transaction flow diagram of an external read-exclusive request to a master-shared or exclusive partition in the main cache 40x and invalid in the processor cache 22x of a processing node 1x. The system sends a read-exclusive request 701 to the main cache 40x. The main cache 40x sends read-exclusive data 712 to the system. The main cache 40x goes to the invalid state.

There are a few cases not illustrated by the aforementioned figures to promote simplicity and clarity of description. These are the cases of an external invalidation message and local cache partition replacements. If the local node has a shared copy of a partition, then an external invalidation can be received for the partition if an external processor wishes to modify the data in that partition. Upon receiving an invalidation message at the local mode, if the processor cache has a shared copy of the partition, an invalidation message is sent to the processor by the main cache to invalidate that copy. Whether or not the processor cache has a copy of the partition, the copy in the main cache is invalidated and an invalidation acknowledgement is returned to the directory.

Cache partition replacements include both replacing shared partitions and replacing exclusive or master partitions. When shared blocks are replaced, the corresponding data is simply discarded. If the partition is discarded from the processor cache, the main cache is notified of the discardation. If the partition is discarded from the main cache, the system is notified of the discardation. When an exclusive partition is replaced in the processor cache, a replacement message containing the data in that partition is sent to the main cache. When an exclusive or a master partition is replaced in the main cache, the partition is sent elsewhere in this system for storage. In other words, the system chooses another main cache in the system to store the associated data.

The default coherence protocol for processor read and write operations to cacheable addresses is invalidation based. Most of a processor's 10x reads and writes are to data cache in the local node 1x, which can be serviced immediately. Request to data not found in the caches are sent to the home directory 50*h*. The protocol actions required to handle read and write operations will be described separately. In the following discussion, the protocol actions required within a node 1*x* will be omitted for the sake of clarity of description because the intranode coherence transactions were previously described.

Figure 8A:
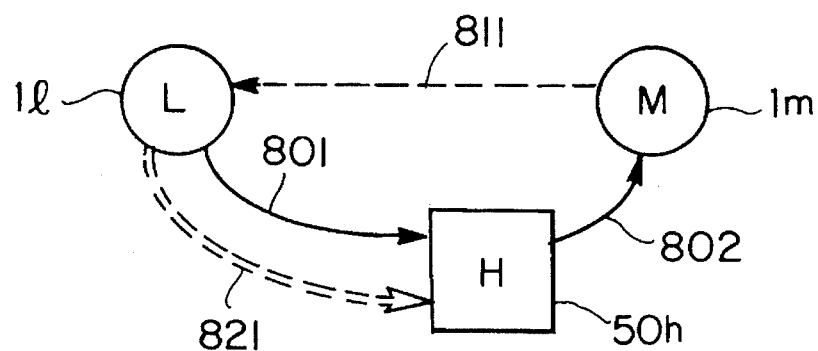
FIGS. 8A and 8B are transaction flow diagrams for read requests to cacheable memory according to a preferred embodiment of the invention.
Figure 8B:
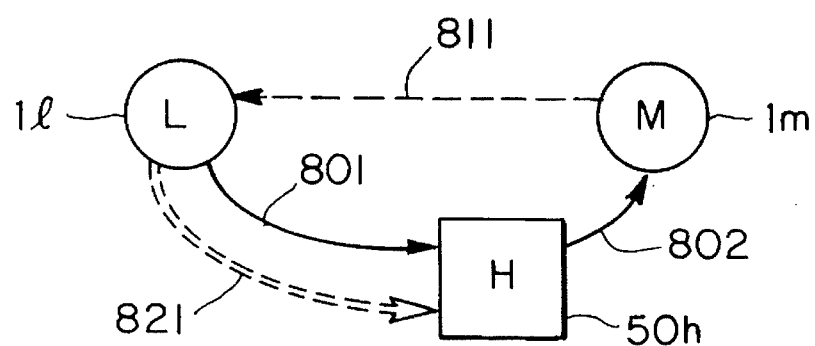

A processor read request that cannot be satisfied by the local node 11 must be sent to the respective home directory 50*h* to determine the current location of the requested data. The node having the data is sent a read request and replies with the data to the requesting node. Upon receipt of the data, the local node 11 will send a data received acknowledgement to the directory, which indicates the conclusion of the memory operation. FIGS. 8A–B are transaction flow diagrams for a read request transaction to cacheable memory.

FIG. 8A is a transaction flow diagram illustrating a read request to a shared partition. A local node 11 sends a read request 801 to the respective home directory 50*h*. The directory 50*h* forwards a request 802 to the respective master node 1*m*. The directory 50*h* adds the local node 11 to the sharing list. The master node 1*m* sends read data 811 to the local node 11. The local node 11 sends a data received acknowledgement message 821 to the home directory 50*h*. The state of the local node 11 goes to shared.

FIG. 8B is a transaction flow diagram illustrating a read request to an exclusive partition. A local node 11 sends a read request 801 to the respective home directory 50*h*. The home directory 50*h* forwards the request 802 to the respective master node 1*m*. The home directory 50*h* adds the local node 11 to the sharing list. The home directory 50*h* goes to the shared state. The master node 1*m* sends read data 811 to the local node 11. The master node 1*m* goes to the master-shared state. The local node 11 sends a data received acknowledgement message 821 to the home directory 50*h*. The local node 11 goes to the shared state.

A processor write request that cannot be satisfied by the local node 11 is translated into a read exclusive request and sent to the home directory 50*h* in much the same fashion as a read request. A read-exclusive request indicates that the requesting processor intends to modify the requested partition and, therefore, wishes to have exclusive access to that data. The home directory 50*h* forwards this request to the master node 1*m*, which replies with data to the requestor. The home directory 50*h* also sends invalidations to all nodes other than the master node 1*m* or the requestor node 11 that currently have copies of the data. When the home directory 50*h* collects all invalidation acknowledgements, then one summary acknowledgement is sent to the requestor 1*l*. The summary acknowledgement indicates that, at this point, no other copies of the requested partition exists. Similar to a read request, a final data received acknowledgement is sent by the requestor 1*l* to the home directory 50*h*.

Figure 9A:
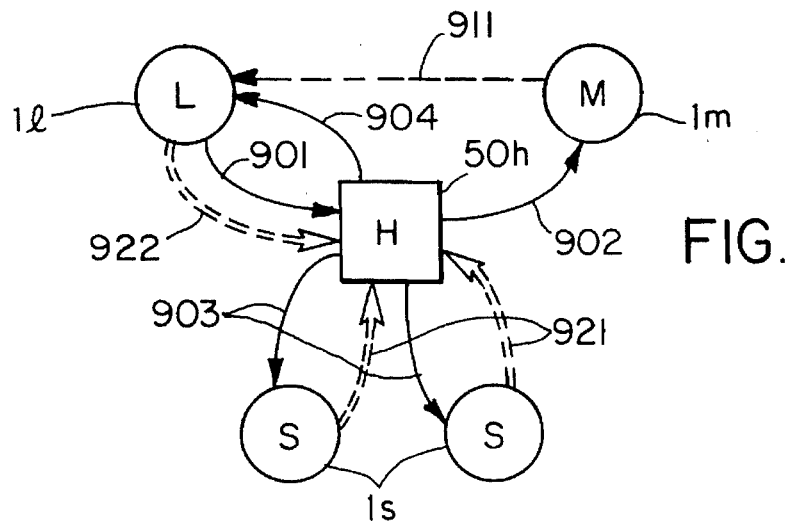
FIGS. 9A, 9B and 9C are transaction flow diagrams for read-exclusive requests to cacheable memory according to a preferred embodiment of the invention.
Figure 9B:
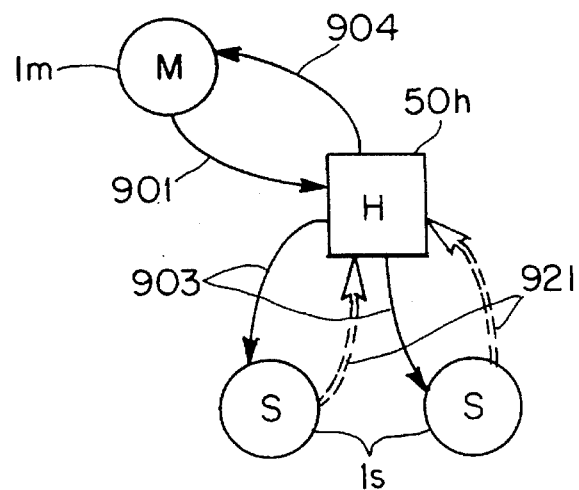
Figure 9C:
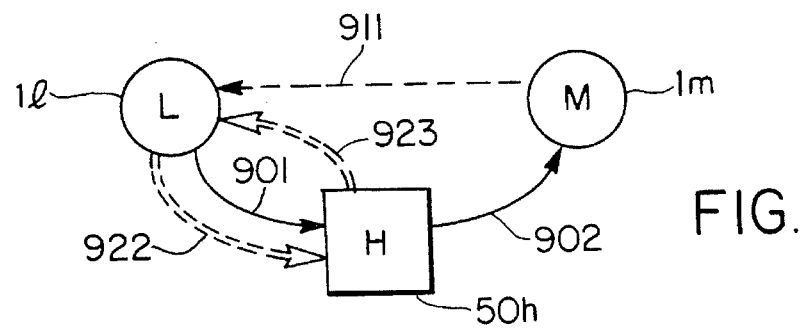

FIGS. 9A–C are transaction flow diagrams for read-exclusive transaction request.

FIG. 9A is a transaction flow illustrating a read exclusive request to a shared partition. A local 1*l* sends a read-exclusive request 901 to the respective home directory 50*h*. The directory 50*h* forwards the request 902 to the respective master node 1*m* and sends invalidation request 903 to other sharer nodes 1*s*. The home directory 50*h* goes to the exclusive state. The master node 1*m* sends the read-exclusive data 911 to the local 1*l*. The master node 1*m* goes to the invalid state. The sharing nodes 1*s* send invalidation acknowledgement messages 921 to the home directory 50*h*. The sharing nodes 1*s* go to the invalid state. The home directory 50*h* sends an acknowledgement complete message 904 to the local 1*l*. The local node sends a data received message 922 to the home directory 50*h*. The local 1*l* goes to the exclusive state.

FIG. 9B is a transaction flow diagram illustrating a read-exclusive request to a shared partition with the local 1*l* being the master node 1*m*. The master node 1*m* sends a read-exclusive request 901 to the respective home directory 50*h*. The home directory 50*h* sends invalidation messages 903 to sharing nodes 1*s*. The home directory 50*h* goes to the exclusive state. The sharing nodes 1*s* send invalidation acknowledgement messages 921 to the home directory 50*h*. The sharing nodes 1*s* go to the invalid state. The home directory 50*h* sends an acknowledgements complete message 904 to the master node 1*m*. The state of the master node 1*m* goes to exclusive.

FIG. 9C is a transaction flow diagram illustrating a read-exclusive request to an exclusive partition. The local 1*l* sends a read-exclusive request 901 to the respective home directory 50*h*. The home directory 50*h* forwards the request 902 to the master node 1*m*. The home directory 50*h* sends an acknowledgements complete message 923 to the local node 1*l*. The master node 1*m* sends the read-exclusive data 911 to the local node 1*l*. The master node 1*m* goes to the invalid state. The local node 1*l* receives the read-exclusive data. The local node sends a data received message 922 to the home directory 50*h*. The local node 1*l* goes to the exclusive state.

There are a few protocol exceptions not covered in the above discussion. These exceptions involve the rare instance when a request arrives at a cache 22*x* or directory 50*x* that cannot respond to the request because the cache 22*x* or directory 50*x* either (1) does not have the data, or (2) is awaiting an acknowledgement to finish processing the partition for a previous request. A cache 22*x* may not have the data if a cache partition replacement has forced that data out of the cache 22*x* to another cache in the system. In these cases, the request is non-acknowledged back to the home directory 50*h* and the request is resent to the new location of the data. The case where an acknowledgement is pending on the partition from a previous request only occurs at the directory 50*x*. The directory 50*x* cannot allow other requests to obtain a data item until all transactions from a previous request have been completed for that data. While this is a limitation of this protocol, this restriction simplifies the number of protocol cases that must be handled as well as the design complexity of the main caches.

Protocol Variations

Although the above preferred embodiment of the invention has been described, variations on the preferred protocol may be employed in a flat cache-only multi-processor architecture, with varying degrees of efficiency. Some protocol variations are described below. These variations are not meant to be inclusive of all possible variations, which are meant to be included within the scope of the invention.

Figure 10A:
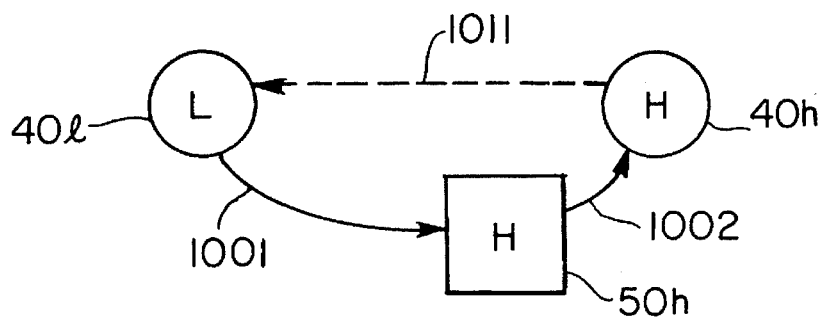
FIGS. 10A, 10B and 10C are transaction flow diagrams for external read requests according to a variant embodiment of the invention.
Figure 10B:
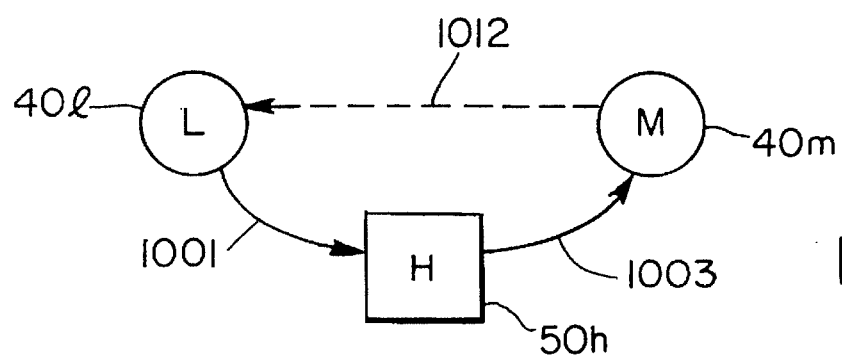
Figure 10C:
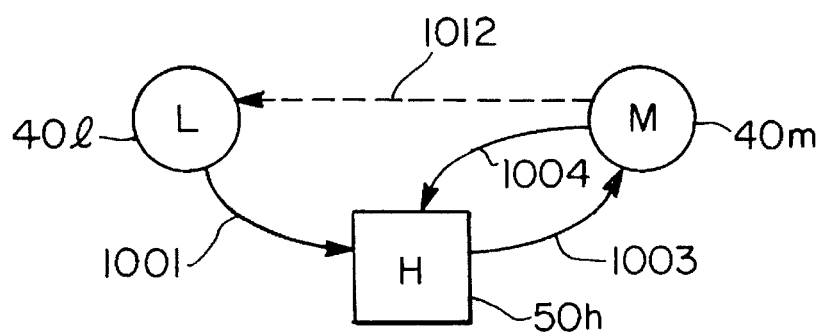

FIGS. 10A–C are variant transaction flow diagrams illustrating external read requests.

FIG. 10A illustrates a read request to a shared partition having a copy at the home node. The local attraction memory 40*l* sends a read request 1001 to the respective home directory 50*h*. The home directory 50*h* forwards the read request 1002 to the home attraction memory 40*h*. The home directory 50*h* adds the local attraction memory 40*l* to the sharing list. The home attraction memory 40*h* sends the read data 1011 to the local attraction memory 40*l*.

FIG. 10B illustrates a read request to a shared partition having a copy only at a remote node. The local attraction memory 40*l* sends a read request 1001 to the respective home directory 50*h*. The home directory 50*h* forwards the read request 1003 to the respective master attraction memory 40*m*. The home directory 50*h* adds the local attraction memory 11 to the sharing list. The master attraction memory 40*m* sends the read data 1012 to the local attraction memory 40*l*.

FIG. 10C illustrates a read request to an exclusive partition. The local attraction memory 40*l* sends a read request 1001 to the respective home directory 50*h*. The home directory 50*h* forwards the read request 1003 to the respective master attraction memory 40*m*. The master attraction memory 40*m* sends the read data 1012 to the local attraction memory 40*l*. The master attraction memory 40*m* sends a sharing request 1004 to the home directory 50*h*. The master attraction memory 40*m* goes to the master-shared state. The home directory 50*h* goes to the shared state. The home directory 50*h* adds the local attraction memory 40*l* to the sharing list.

Figure 11A:
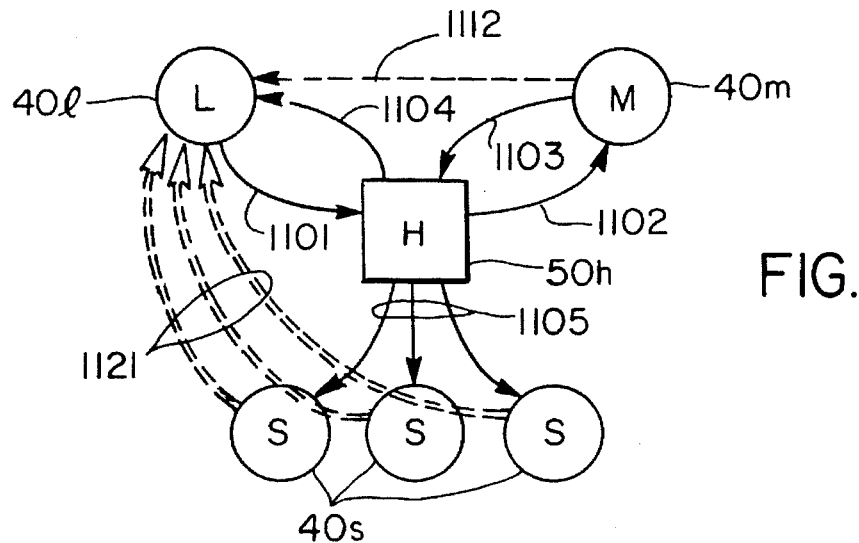
FIGS. 11A, 11B and 11C are transaction flow diagrams for external read-exclusive requests according to a variant embodiment of the invention.
Figure 11B:
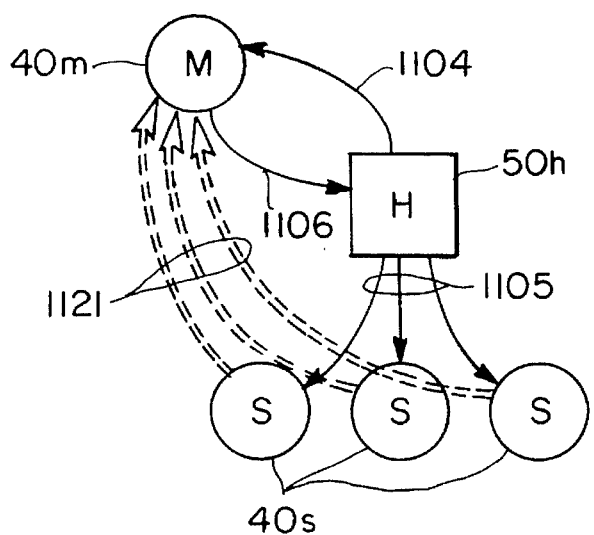
Figure 11C:
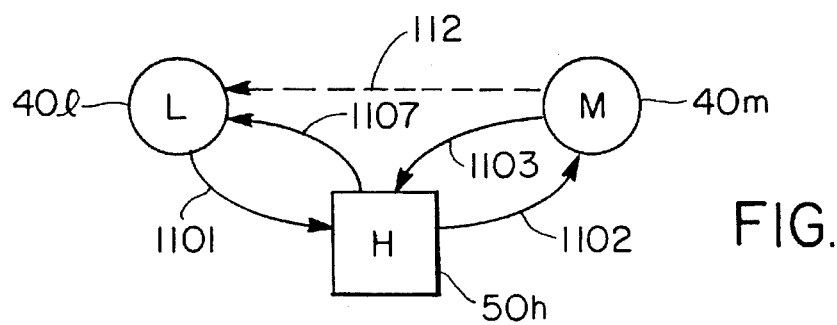

FIGS. 11A–C are variant transaction flow diagrams for external read-exclusive request.

FIG. 11A illustrates a read-exclusive request to a shared partition. The local attraction memory 40*l* sends a read-exclusive request 1101 to the respective home directory 50*h*. The home directory 50*h* forwards the request 1102 to the respective master attraction memory 40*m*. The master attraction memory 40*m* sends the read-exclusive data 1112 to the local attraction memory 40*l*. The master attraction memory 40*m* sends a transfer request 1103 to the home directory 50*h*. The master attraction memory 40*m* goes to the invalid state. The home directory 50*h* sends a transfer acknowledgement request 1104 to the local attraction memory 40*l*. The home directory 50*h* sends invalidation request 1105 to all attraction memories 40*s* on the sharing list. The directory master pointer is set to point to the local attraction memory 40*l*. The home directory 50*h* goes to the exclusive state. The sharer attraction memories 40*s* send invalidation acknowledgement messages 1121 to the local attraction memory 40*l*.

FIG. 11B illustrates a read-exclusive request to a shared partition where the local attraction memory is the master attraction memory. The master attraction memory 40*m* sends a transfer request 1106 to the respective home directory 50*h*. The home directory 50*h* goes to the exclusive state. The home directory 50*h* sends a transfer acknowledgement 1104 to the master attraction memory 40*m*. The home directory 50*h* sends invalidations 1105 to all attraction memories 40*s* on the sharing list. The sharer attraction memories 40*s* send invalidation acknowledgements 1121 to the master attraction memory 40*m*. The sharer attraction memories 40*s* go to the invalid state.

FIG. 11C illustrates a read-exclusive request to an exclusive partition. The local attraction memory 40*l* sends a read-exclusive request 1101 to the respective home directory 50*h*. The home directory 50*h* forwards the request 1102 to the respective master attraction memory 40*m*. The master attraction memory 40*m* sends the read-exclusive data 1112 to the local attraction memory 40*l*. The master attraction memory 40*m* sends a transfer request 1103 to the home directory 50*h*. The master attraction memory 40*m* goes to the invalid state. The home directory 50*h* receives the transfer acknowledgement. The master pointer in the directory 50*h* points to the local attraction memory 40*l*. The home directory 50*h* sends a master transfer acknowledgement 1107 to the local attraction memory 40*l*.

A transfer acknowledgement message is necessary due to a race condition that exists between the data reply and the ownership transfer request messages. It is possible that the local attraction memory 40*l* may receive the data early and then write back the received partition even before the transfer request message has reached the home directory 50*h*. By requiring the local attraction memory 40*l* to wait for an acknowledgement message 1104 before allowing the local attraction memory 40*l* to give up the exclusive copy, this protocol guarantees that the ownership transactions at the home directory 50*h* occur in the correct order.

As previously discussed, because there is no physical memory backing up the attraction-memory cache blocks, replacements need special care to avoid replacing the last remaining copy of a data item. A node that initiates replacement of a shared partition simply discards the partition and then informs the home node 1*h* to remove the initiating node from the sharing list. However, if the state of the partition is either exclusive or master-shared, then the initiating node is currently the master node 1*m* and must send the replaced data item to the home node 1*h*. The home node 1*h* must now nominate a new master node 1*m*. If there are other nodes with copies, an arbitrary node among them is nominated as the master node 1*m*. If there are no other copies of the data item, then a fresh space for the replaced data item must be found. While there are many different strategies possible, one reasonable strategy is to make a place for the replaced partition in the home node 1*h* itself. This strategy will minimize the data access latency for that data item by subsequent request. Transaction flow diagrams illustrating replacements are shown in FIGS. 12A–D.

Figure 12A:
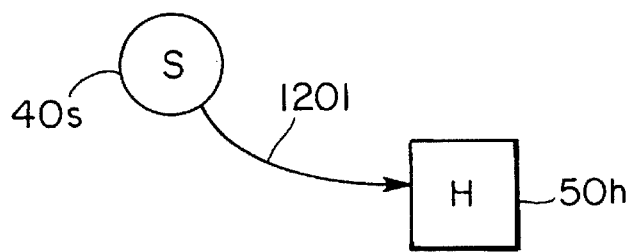
FIGS. 12A, 12B and 12C are transaction flow diagrams for block replacements according to a variant embodiment of the invention.

FIG. 12A illustrates replacement of a shared partition. The local attraction memory 40*s* sends a share replacement request 1201 to the respective home directory 50*h*. The sharer attraction memory 40*s* goes to the invalid state. The home directory 50*h* removes the local attraction memory 40*s* from the sharing list.

Figure 12B:
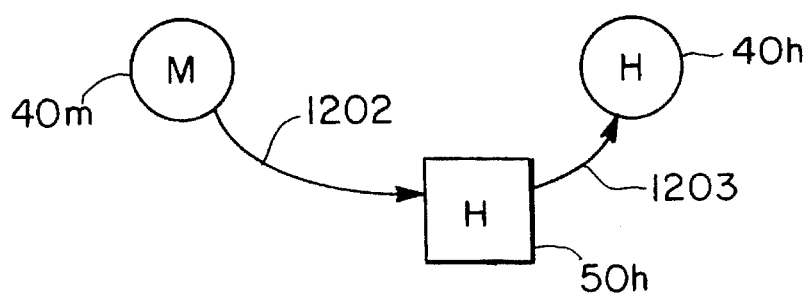

FIG. 12B illustrates replacement of a master shared partition having either home attraction memory sharing or no attraction memory sharing. The master attraction memory 40*m* sends a replace request with data 1202 to the respective home directory 50*h*. The master attraction memory 30*m* goes to the invalid state. The home directory 50*h* forwards the request 1203 to the home attraction memory 40*h*. The home directory 50*h* sets the master pointer to the home attraction memory 40h. The home directory 50*h* removes the home attraction memory 40*h* from the sharing list. The home attraction memory 40*h* goes to the master-shared state.

Figure 12C:
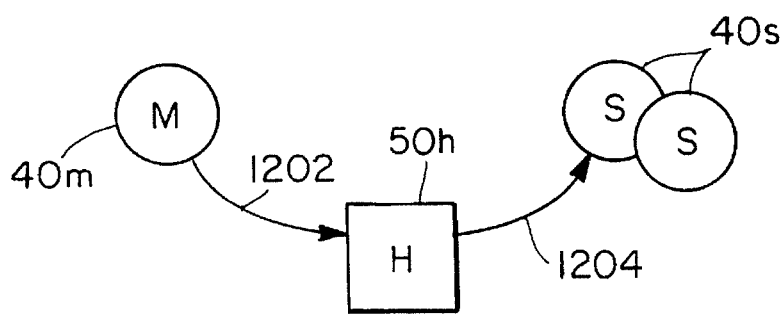

FIG. 12C illustrates a replacement of a master-shared partition having multiple sharers but having no copy at the home attraction memory. The master attraction memory 40*m* sends a replace request with data 1202 to the respective home directory 50*h*. The master attraction memory 40*m* goes to the invalid state. The home directory 50*h* forwards the request 1204 to sharer attraction memories 40*s* selected at random. The home directory 50*h* sets the master pointer to the sharer attraction memories 40*s*. The sharer attraction memory states go to the master-shared state.

Figure 12D:
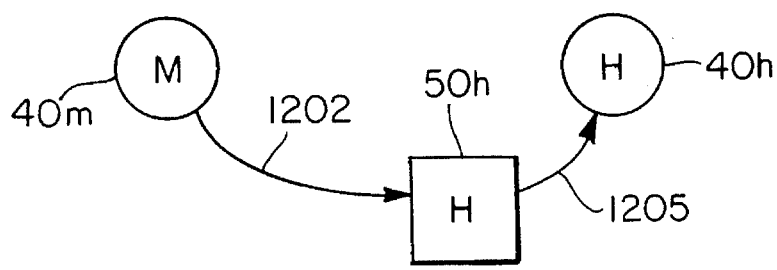

FIG. 12D illustrates a replacement of an exclusive partition. The master attraction memory 40*m* sends a replace request with data 1202 to the respective home directory 50*h*. The master attraction memory 40*m* goes to the invalid state. The home directory 50*h* forwards an exclusive data replace request with the exclusive data 1205 to the home attraction memory 40*h*. The home directory 50*h* sets the master pointer to the home attraction memory 40*h*. The home attraction memory 40*h* goes to the exclusive state.

There are optimizations on the variant protocol that allow requests to be sent directly to the master node 1*m* without having to first go to the home node 1*h* to do a directory look-up. There are at least two such optimizations, or directory hints, that will be considered. Invalid hints are hints associated with partitions present in the attraction memory but marked "invalid". Shared hints are hints associated with partitions present in the attraction memory and marked "shared".

Focusing first on invalid hints, an invalidation or read-exclusive request arriving at an attraction memory invalidates the corresponding local memory partition. Because the identity of the requestor node generating this coherence message is included in the message, the identify can be stored in the local partition being invalidated as an invalid hint. When the local processor generates a request to this memory partition, the request is forwarded directly to the node indicated by the previously stored identifier, without going through the home directory first.

Shared hints are recorded when the local attraction memory receives a read data reply. A read data reply message includes the identify of the master node supplying the data, and this identity can be stored and used as the shared hint. In contrast to invalid hints, shared hints require extra storage with each memory partition. When the local node generates a read-exclusive request to this memory block, the request can now be forwarded directly to the node indicated by the shared hint without going through the home directory first.

Figure 13A:
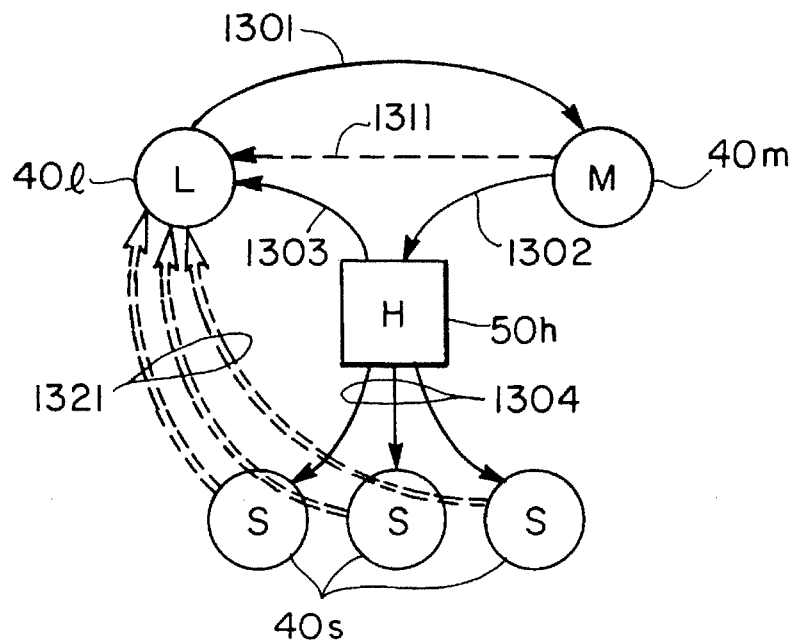
FIGS. 13A, 13B and 13C are transaction flow diagrams using directory hints.
Figure 13B:
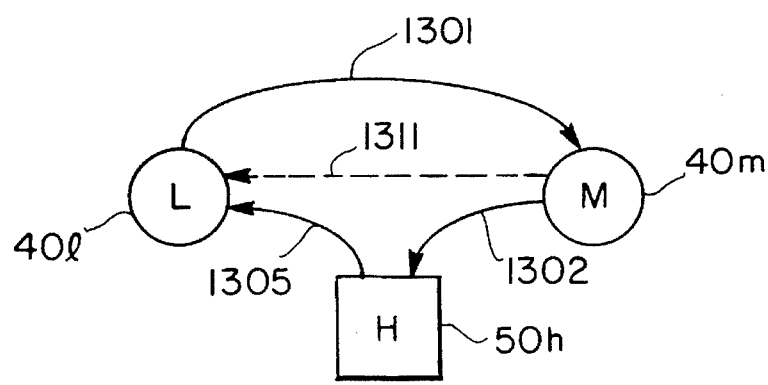
Figure 13C:
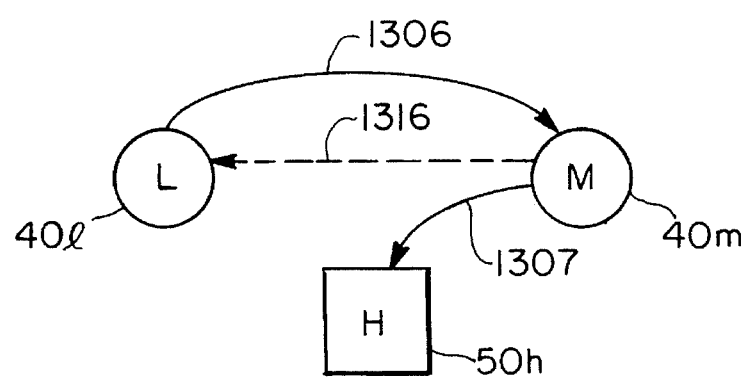

FIGS. 13A–C are transaction flow diagrams for read and read-exclusive request using directory hints.

FIG. 13A illustrates a read-exclusive request to a shared partition. The local attraction memory 40*l* sends a read-exclusive request 1301 to the master attraction memory 40*m*. The master attraction memory 40*m* sends the read-exclusive data 1311 to the local attraction memory 40*l*. The master attraction memory 40*m* sends a transfer request 1302 to the home directory 50*h*. The master attraction memory 40*m* goes to the invalid state. The home directory 50*h* sends a transfer acknowledgement 1303 to the local attraction memory 40*l*. The home directory 50*h* sends invalidations 1304 to all attraction memories 40*s* no the sharing list. The master pointer in the home directory 50*h* is set to point to the local attraction memory 40*l*. The home directory 50*h* goes to the exclusive state. The sharer attraction memories 40*s* send invalidation acknowledgement messages 1321 to the local attraction memory 40*l*.

FIG. 13B illustrates a read-exclusive request to an exclusive partition. The local attraction memory 40*l* sends a read-exclusive request 1301 to the respective master attraction memory 40*m*. The master attraction memory 40*m* sends the read-exclusive data 1311 to the local attraction memory 40*l*. The master attraction memory 40*m* sends a transfer request 1302 to the home directory 50*h*. The master attraction memory 40*m* goes to the invalid state. The home directory 50*h* receives the transfer acknowledgement 1302. The master pointer in the home directory 50*h* is set to point to the local attraction memory 40*l*. The home directory 50*h* sends a master transfer acknowledgement 1305 to the local attraction memory 40*l*.

FIG. 13C illustrates a read request to a shared or an exclusive partition. The local attraction memory 40*l* sends a read request 1306 to the respective master attraction memory 40*m*. The master attraction memory 40*m* sends the read data 1316 to the local attraction memory 40*l*. The master attraction memory 40*m* sends a sharing request 1307 to the home directory 50*h*. The home directory 50*h* goes to the shared state.

Memory requests that use hints can eliminate one network traversal in obtaining the data, if the hint correctly indicates which node is the master node. Directory hints that are incorrect require one additional network traversal to reroute the request message to the home directory from the incorrectly inferred master node. Therefore, a 50% success rate for directory hints is required for the performance of this protocol variation to break even. Directory hints are useful in all cases in reducing the network bandwidth requirement by reducing network traversals.

Equivalents

Those skilled in the art will know, or be able to ascertain using no more than routine experimentation, many equivalents to the specific embodiments of the invention described herein. These and all other equivalents are intended to be encompassed by the following claims.

The invention claimed is:

1. A shared-memory computer system having a plurality of coupled processing nodes, each processing node having a processor for executing software instructions, and a main memory portion of a global shared memory space organized in pages, each page having a plurality of respectively addressed data items, the computer system comprising:

a plurality of home processing nodes assigned from the plurality of processing nodes, each data item in the global shared memory space assigned to a home processing node based on the address of the respective data item;

for a data item in the global shared memory space, a master processing node from the plurality of processing nodes wherein a current copy of the data item is stored, there being at least one data item in the global shared memory space having its home processing node different from its master processing node; and for each home processing node, a home directory memory located at the home processing node for centralizing directory information for each data item assigned to the home processing node.

2. The computer system of claim 1 wherein the directory information comprises:

an indication of the current state of the data item:

a pointer to the master processing node for the data item, the master processing node being the exactly one processing node having a master copy of the data item; and a list of sharer nodes, each sharer node having a copy of the data item.

3. The computer system of claim 1 wherein the assignments of home processing nodes are essentially uniformly distributed among the processing nodes.

4. The computer system of claim 1 wherein the home processing nodes are assigned by a hashing function.

5. The computer system of claim 4 wherein the hashing function is based on the high-order bits of the address in the memory space of each data item.

6. The computer system of claim 1 wherein the main memory portion of the global shared memory space is an attraction memory cache.

7. The computer system of claim 6 wherein the main attraction memory cache is divided into a plurality of banks.

8. The computer system of claim 1 wherein the home directory memory controls dissemination of requests for operations on data items centralized in the home directory.

9. The computer system of claim 1 further comprising a general interconnection network for coupling the processing nodes.

10. A method of maintaining memory coherence in a shared-memory computer system having a plurality of coupled processing nodes, the processing nodes sharing a memory space organized in pages, each page having a plurality of respectively addressed data items, the method comprising the steps of:

assigning a home processing node from the plurality of processing nodes for each data item in the memory space based on the address of the respective data item;

storing a current copy of a data item in the memory space in a master processing node from the plurality of processing nodes, there being at least one data item in the memory space having its home processing node different from its master processing node; and centralizing directory information for each data item assigned to each home processing node.

11. The method of claim 10 wherein the step of centralizing comprises:

maintaining a state for each data item centralized in the home processing node;

maintaining a pointer to the master processing node for each data item, the master processing node being the exactly one processing node having a master copy of the data item; and maintaining a sharer list of the processing nodes having a copy of the data item.

12. The method of claim 10 wherein the step of assigning comprises essentially uniformly distributing the assignments of home processing nodes among the processing nodes based on the address of each data item in the memory space.

13. The method of claim 12 wherein the step of assigning comprises hashing on the address of the data item.

14. The method of claim 13 wherein the step of hashing is based on the high-order bits of the address of the data item.

15. The method of claim 10 further comprising the step of disseminating a request from a requestor processing node to a master processing node, the master processing node being the exactly one processing node having a master copy of the data item.

16. A shared-memory computer having a plurality of coupled processing nodes, comprising:

a) a global shared memory space organized in pages, each page having a plurality of respectively addressed data items;

b) a plurality of master processing nodes from the plurality of coupled processing nodes, each master processing node having stored therein a master copy of a data item in the global shared memory space;

c) a plurality of home processing nodes from the plurality of coupled processing nodes, each home processing node including:

a data processor for executing software instructions;

a main memory cache to the global shared memory space;

a plurality of assigned data items, each assigned data item assigned to the assigned home processing node based on the address of the respective data item; and a directory memory for centralizing directory information for each data item assigned to the assigned home processing node, the directory information including an indication of the master processing node for the respective data item;

d) at least one data item having its home processing node differing from its master processing node; and e) a general interconnection network for coupling the processing nodes.

17. The computer of claim 16 wherein the directory memory comprises:

a state memory for maintaining the current state of each data item assigned to the processing node;

a pointer to the master processing node for each data item, the master processing node being the exactly one processing node having a master copy of the data item; and a list of sharer nodes, each sharer node having a copy of the data item.

18. The computer of claim 16 wherein the main memory cache is organized as an attraction memory.

19. The computer of claim 18 wherein the attraction memory is not backed-up by physical memory.

20. The computer of claim 16 wherein there is one home processing node assigned for each addressed data item.

21. A method of accessing a data item from a memory page of data items, the data item stored external to a local processing node of a shared-memory computer system having a plurality of processing nodes, comprising the steps of:

transmitting a first access request from the local processing node to a home processing node, the home processing node being statically assigned to the data item;

in the home processing node, determining a master processing node having a current copy of the data item;

transmitting a second access request from the home processing node to the master processing node; and transmitting a copy of the data item from the master processing node to the local processing node.

22. The method of claim 21 wherein the first access request is a read access request and further comprising the step of adding the local processing node to a list of processing nodes having read access to the data item, the list maintained in the home processing node.

23. The method of claim 21 wherein the first access request is a write access request and further comprising the steps of:

invalidating shared copies of the data item, the shared copies of the data item being on at least one processing node other than the local processing node; and designating the local processing node as the master processing node.

24. The method of claim 23 wherein the step of invalidating comprises invalidated the copy of the data item on the master processing node.

25. The method of claim 21 further comprising a step of transmitting an acknowledgement message from the local processing node to the home processing node to acknowledge receipt of the copy of the data item.

26. The method of claim 21 wherein the second access request is a duplicate of the first access request.

27. A shared-memory computer system having a plurality of coupled processing nodes, each processing node having a processor for executing software instructions, a main memory portion of a global shared memory space organized in pages, each page having a plurality of respectively addressed data items, the computer system comprising:

a plurality of home processing nodes assigned from the plurality of processing nodes, each data item assigned to a home processing node by a hashing function based on the address of each data item; and for each home processing node, a home directory memory located at the home processing node for centralizing directory information for each data item assigned to the home processing node, each data item residing in a master processing node from the plurality of processing nodes.

28. The computer system of claim 27 wherein the directory information comprises:

an indication of the current state of the data item:

a pointer to the master processing node for the data item, the master processing node being the exactly one processing node having a master copy of the data item; and a list of sharer nodes, each sharer node having a copy of the data item.

29. The computer system of claim 27 wherein the assignments of home processing nodes are essentially uniformly distributed among the processing nodes.

30. The computer system of claim 27 wherein there is at least one data item in the global shared memory space which has its home processing node different from its master processing node.

31. The computer system of claim 27 wherein the main memory portion of the global shared memory space is an attraction memory cache.

32. The computer system of claim 27 wherein the home directory memory controls dissemination of requests for operations on data items centralized in the home directory.

33. The computer system of claim 27 further comprising a general interconnection network for coupling the processing nodes.

34. A method of maintaining memory coherence in a shared-memory computer system having a plurality of coupled processing nodes, the processing nodes sharing a memory space organized in pages, each page having a plurality of respectively addressed data items, the method comprising the steps of:

assigning a home processing node from the plurality of processing nodes for each data item in the memory space by a hashing function based on the address of each data item; and centralizing directory information for each data item assigned to each home processing node, each data item residing in a master processing node from the plurality of processing nodes.

35. The method of claim 34 wherein the step of centralizing comprises:

maintaining a state for each data item centralized in the home processing node;

maintaining a pointer to the master processing node for each data item, the master processing node being the exactly one processing node having a master copy of the data item; and maintaining a sharer list of the processing nodes having a copy of the data item.

36. The method of claim 34 wherein the step of assigning comprises essentially uniformly distributing the assignments of home processing nodes among the processing nodes.

37. The method of claim 34 further comprising the step of providing at least one data item having its home processing node different from its master processing node.

38. The method of claim 34 further comprising the step of disseminating a request from a requestor processing node to a master processing node, the master processing node being the exactly one processing node having a master copy of the data item.

* * * * *

UNITED STATES PATENT AND TRADEMARK OFFICE
CERTIFICATE OF CORRECTION

PATENT NO.   :   5,535,116
DATED        :   July 9, 1996
INVENTOR(S)  :   Anoop Gupta and Truman Joe It is certified that error appears in the above-indentified patent and that said Letters Patent is hereby corrected as shown below:

In Claim 7, column 18, line 57, delete the word "main".

Signed and Sealed this

Twenty-sixth Day of November 1996

Attest:

BRUCE LEHMAN

*Attesting Officer*     *Commissioner of Patents and Trademarks*